(12) United States Patent
Ma et al.

(10) Patent No.: US 12,253,207 B2
(45) Date of Patent: Mar. 18, 2025

(54) SHOCK-ABSORBING AND MAGNETIC QUICK RELEASE SYSTEM

(71) Applicant: Guangdong Shuowei Technology Co., Ltd, Dongguan (CN)

(72) Inventors: Wenhong Ma, Dongguan (CN); Lei Luo, Dongguan (CN); Hui Xia, Dongguan (CN); Lei Liu, Dongguan (CN)

( * ) Notice: Subject to any disclaimer, the term of this patent is extended or adjusted under 35 U.S.C. 154(b) by 0 days.

(21) Appl. No.: 18/829,393

(22) Filed: Sep. 10, 2024

(65) Prior Publication Data

US 2024/0426418 A1    Dec. 26, 2024

(51) Int. Cl.
*F16M 11/04* (2006.01)
*F16M 11/14* (2006.01)

(52) U.S. Cl.
CPC ........... *F16M 11/041* (2013.01); *F16M 11/14* (2013.01)

(58) Field of Classification Search
CPC ................ F16F 15/08; F16M 11/041
See application file for complete search history.

(56) References Cited

U.S. PATENT DOCUMENTS

| | | | |
|---|---|---|---|
| 10,197,130 B2 * | 2/2019 | Liu | F16M 11/2035 |
| 11,675,254 B2 * | 6/2023 | Zhou | G03B 17/561 |
| | | | 396/428 |
| 11,873,047 B2 * | 1/2024 | Peters | F16F 1/3732 |
| 12,085,224 B2 * | 9/2024 | Ma | F16M 13/02 |
| 2012/0199620 A1 * | 8/2012 | Gold | B62J 11/00 |
| | | | 224/413 |
| 2012/0248166 A1 * | 10/2012 | Gold | F16M 13/022 |
| | | | 248/636 |
| 2012/0293930 A1 * | 11/2012 | Schanz | B62J 50/225 |
| | | | 361/679.01 |
| 2022/0333665 A1 * | 10/2022 | Chan | F16F 15/02 |
| 2024/0077168 A1 * | 3/2024 | Li | F16M 11/14 |
| 2024/0344651 A1 * | 10/2024 | Saunders | F16M 11/14 |

* cited by examiner

*Primary Examiner* — Bradley Duckworth
(74) *Attorney, Agent, or Firm* — Daniel M. Cohn; Howard M. Cohn

(57) ABSTRACT

The present invention discloses a shock-absorbing and magnetic quick release system, which relates to the technical field of electronic product accessories. The system comprises a magnetic quick release mechanism and a shock-absorbing mechanism. The magnetic quick release mechanism comprises a fixing seat and a quick release plate, and the opposite surfaces of the fixing seat and quick release plate are embedded with magnets for attracting each other. The fixing seat has an internal slot. The quick release plate can be separated from the fixing seat by gripping quick release buttons to drive buckles out of locking holes to achieve a quick release. When installing the quick release plate, the magnetic function can directly drive the locking holes to lock the buckles, so the installation is quicker. The shock-absorbing mechanism can help to buffer the vibration transmitted by the magnetic quick release mechanism, reducing potential damages to smart devices. The shock-absorbing mechanism and magnetic quick release mechanism can be used together or separately or respectively in conjunction with a smart device fixing mechanism. With a multi-scenario holder universal ball, they can be connected to supporting holders for use in different scenarios based on users' requirements.

10 Claims, 10 Drawing Sheets

SHOCK-ABSORBING AND MAGNETIC QUICK RELEASE SYSTEM

FIELD OF THE INVENTION

The present invention relates to the technical field of electronic product accessories, particularly to a shock-absorbing and magnetic quick release system.

BACKGROUND OF THE INVENTION

When smart devices such as a mobile phone or a tablet PC is intended to be hands-freely used, it needs to be supported by a stand. The stand can be used to adjust the angle of the smart device, making it more convenient for users. It can also be used in mobile scenarios regarding cars, yachts, motorcycles and bicycles, etc.

Release and fixation of existing holders are relatively complicated. Although holders can help to keep stable fixation and protection of smart devices, they are hard to switch among application scenarios of devices and achieve rapid release. The process is complicated and slow, bringing bothersome troubles to users.

DESCRIPTION OF THE INVENTION

In order to achieve the above purposes, the present invention provides the following technical solution: a shock-absorbing and magnetic quick release system comprising a magnetic quick release mechanism and a shock-absorbing mechanism; the magnetic quick release mechanism comprises a fixing seat and a quick release plate, and the opposite surfaces of the fixing seat and quick release plate are embedded with magnets for attracting each other;

The fixing seat has a slot, and the bottom of the quick release plate has a connecting ring with one end extending to the interior of the slot; several locking holes are set around the connecting ring;

At least two quick release buttons are symmetrically set in the slot; one end of each quick release button extends to the outside of the fixing seat, and the top of the other end has a limit plate; one end of each limit plate has a buckle for internally locking with one of the locking holes; by pressing the quick release buttons, the buckles can be driven out of the locking holes, thus the quick release plate can be removed;

The shock-absorbing mechanism comprises a shock-absorbing holder I and a shock-absorbing holder II; the shock-absorbing holder I is set at the top of the quick release plate, and a spring and several rubber shock-absorbing sleeves are used between the shock-absorbing holder I and II.

As a preferred technical solution of the present invention, a connecting base is fixedly set at the middle of the slot, and a limit slot is set at the top of the connecting base; one end of each limit plate away from the buckles extends to the inside of the limit slot.

As a preferred technical solution of the present invention, one end of each quick release button has a connecting seat, the buckles and limit plates are set at the top of the connecting seats and the end top of each buckle away from the corresponding limit plate is arc-shaped; a compression spring is provided in the connecting base, and the two ends of the compression spring are respectively in contact with the corresponding ends of the two quick release buttons.

As a preferred technical solution of the present invention, the quick release plate and fixing seat have a total of eight magnets, and the eight magnets are divided into upper and lower groups; each group has four magnets, one group is used as the transmitting end and the other, receiving end.

As a preferred technical solution of the present invention, a bottom plate is provided in the fixing seat, a connecting groove I is set at the bottom of the bottom plate, a connecting boss I is set at the top of the quick release plate, and a screw I is used in the connecting boss I.

As a preferred technical solution of the present invention, the bottom of the bottom plate is connected to a multi-scenario holder universal ball through a long screw, and the top of the multi-scenario holder universal ball has a connecting boss II for fitting with the connecting groove I.

As a preferred technical solution of the present invention, at least four downward bending connecting lugs I are set around the shock-absorbing holder I, at least four downward bending connecting lugs II are set around the shock-absorbing holder II; four rubber shock-absorbing sleeves are used, both ends of each rubber shock-absorbing sleeve have limit screw locking slots, and both ends of each rubber shock-absorbing sleeve are respectively locked in the connecting lugs I and II (221) through the limit screw locking slots.

As a preferred technical solution of the present invention, one end of each rubber shock-absorbing sleeve (25) is internally provided with a limit screw I, and the other end is internally provided with a limit screw II fitting with the limit screw I, and the shock-absorbing holder I is internally provided with a nut I fitting with the screw I.

As a preferred technical solution of the present invention, the bottom of the shock-absorbing holder I has a connecting groove II fitting with the connecting boss I, and the bottom of the shock-absorbing holder I also has a spacer.

As a preferred technical solution of the present invention, the top of the shock-absorbing holder II is embedded with a connecting piece, and the interior of the connecting piece has a connecting boss III; the bottom of the shock-absorbing holder II has a screw II with one end passing through the top of the connecting boss III.

Compared with the prior art, the present invention provides a shock-absorbing and magnetic quick release system, which has the following beneficial effects:

For this shock-absorbing and magnetic quick release system, the quick release plate can be separated from the fixing seat by gripping the quick release buttons to the drive buckles out of the locking holes to achieve a quick release; when installing the quick release plate, the magnetic function can directly drive the locking holes to lock the buckles, so the installation is quicker; the shock-absorbing mechanism can help to buffer the vibration transmitted by the magnetic quick release mechanism, reducing potential damages to smart devices; the shock-absorbing mechanism and magnetic quick release mechanism can be used together or separately or respectively in conjunction with a smart device fixing mechanism. With a multi-scenario holder universal ball, they can be connected to supporting holders for use in different scenarios based on users' requirements.

In the figures: 1. Magnetic quick release mechanism; 11. Fixing seat; 111. Bottom plate; 112. Connecting groove I; 12. Quick release plate; 121. Connecting boss I; 13. Screw I; 14. Connecting ring; 141. Locking hole; 15. Multi-scenario holder universal ball; 151. Long screw; 152. Connecting boss II; 16. Slot; 161. Connecting base; 162. Limit slot; 17. Quick release button; 171. Limit plate; 172. Buckle; 173. Connecting seat; 18. Compression spring; 19. Magnet; 2. Shock-absorbing mechanism; 21. Shock-absorbing holder I; 211. Connecting lug I; 212. Connecting groove II; 213. Spacer; 22. Shock-absorbing holder II; 221. Connecting lug II; 23. Limit screw I; 24. Limit screw II; 25. Rubber shock-absorbing sleeve; 251. Limit screw locking slot; 26. Connecting piece; 261. Connecting boss III; 27. Screw II; 28. Spring; 29. Nut I; 3. Smart device fixing mechanism; 31. Connecting groove III; 32. Nut II.

DETAILED DESCRIPTION OF THE EMBODIMENTS

The following will provide a clear and complete description of the technical solutions regarding the embodiments of the present invention in conjunction with the drawings. It is obvious that the described embodiments are only a part of those of the present invention. Based on the embodiments of the present invention, all other embodiments obtained by common technicians in the art without making creative labor shall fall within the protection of the present invention.

Figure 1:
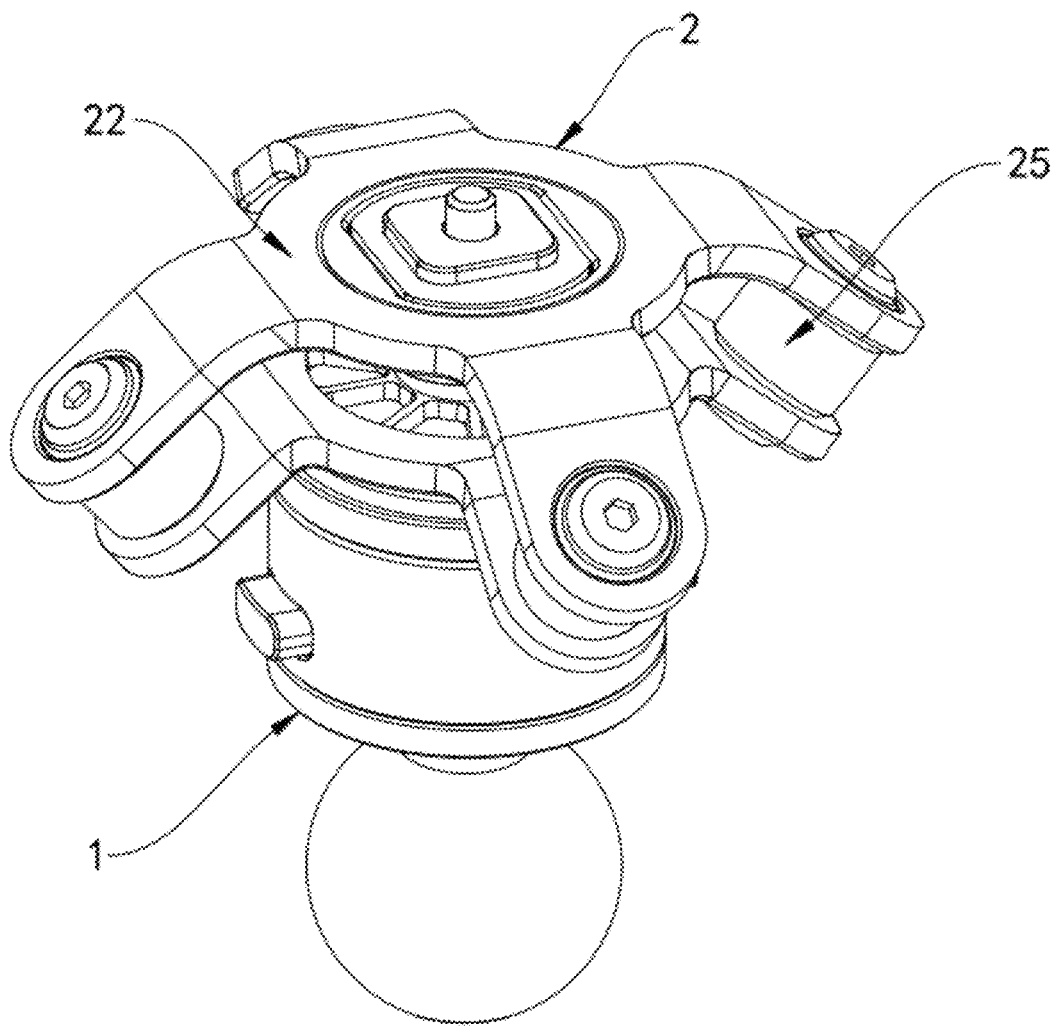
FIG. 1 shows a structure diagram of a shock-absorbing and magnetic quick release system proposed by the present invention.
Figure 2:
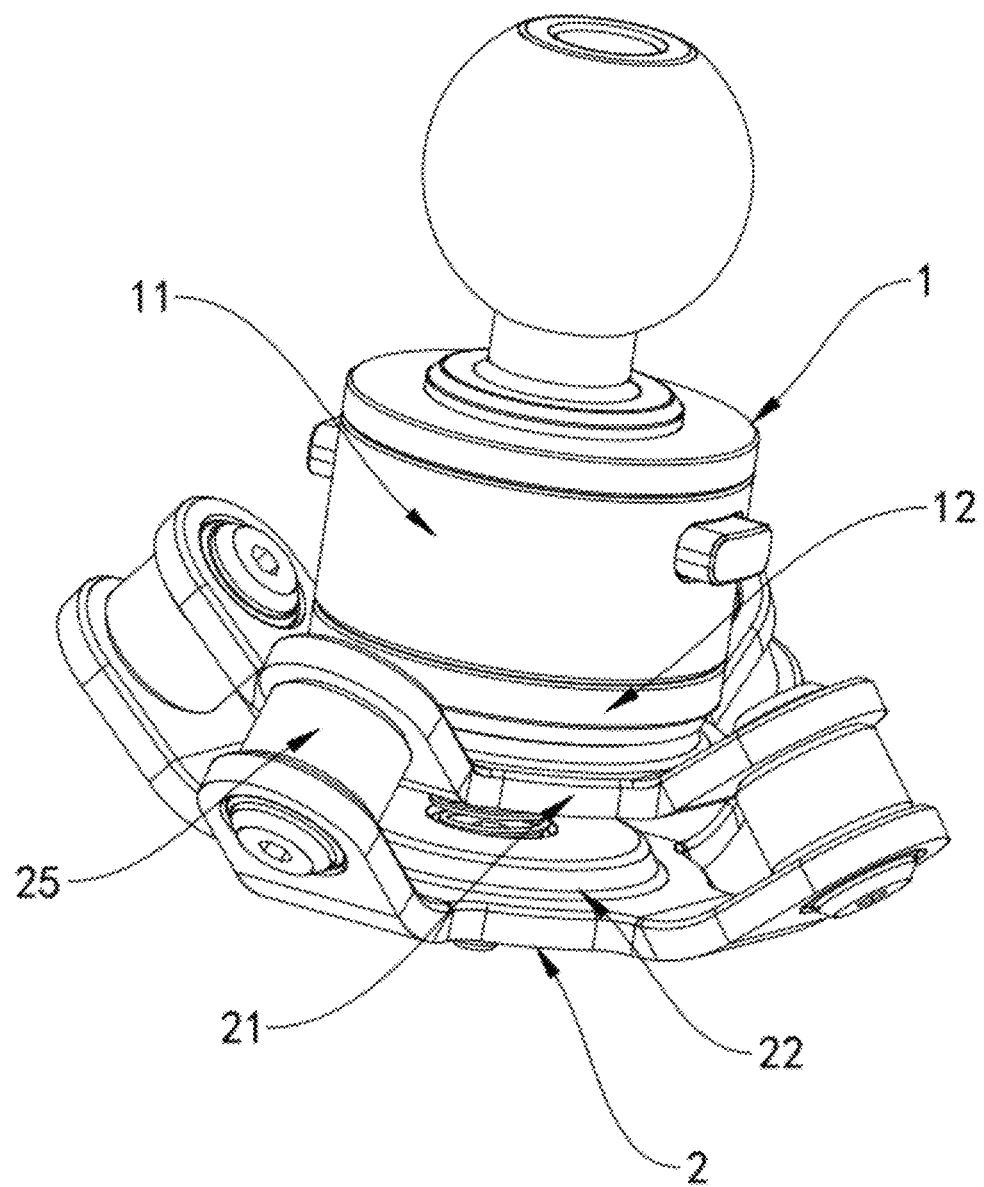
FIG. 2 shows a structure diagram of the magnetic quick release mechanism of a shock-absorbing and magnetic quick release system proposed by the present invention.
Figure 3:
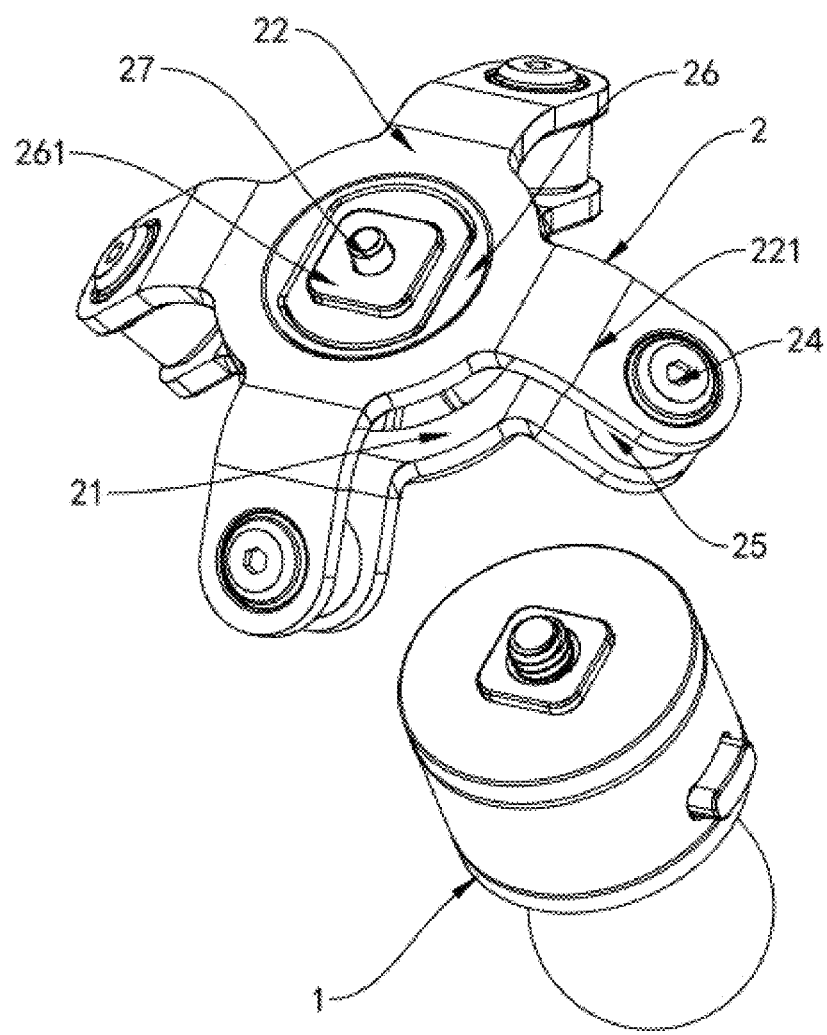
FIG. 3 shows a schematic diagram of a separation between the shock-absorbing mechanism and magnetic quick release mechanism of a shock-absorbing and magnetic quick release system proposed by the present invention.
Figure 4:
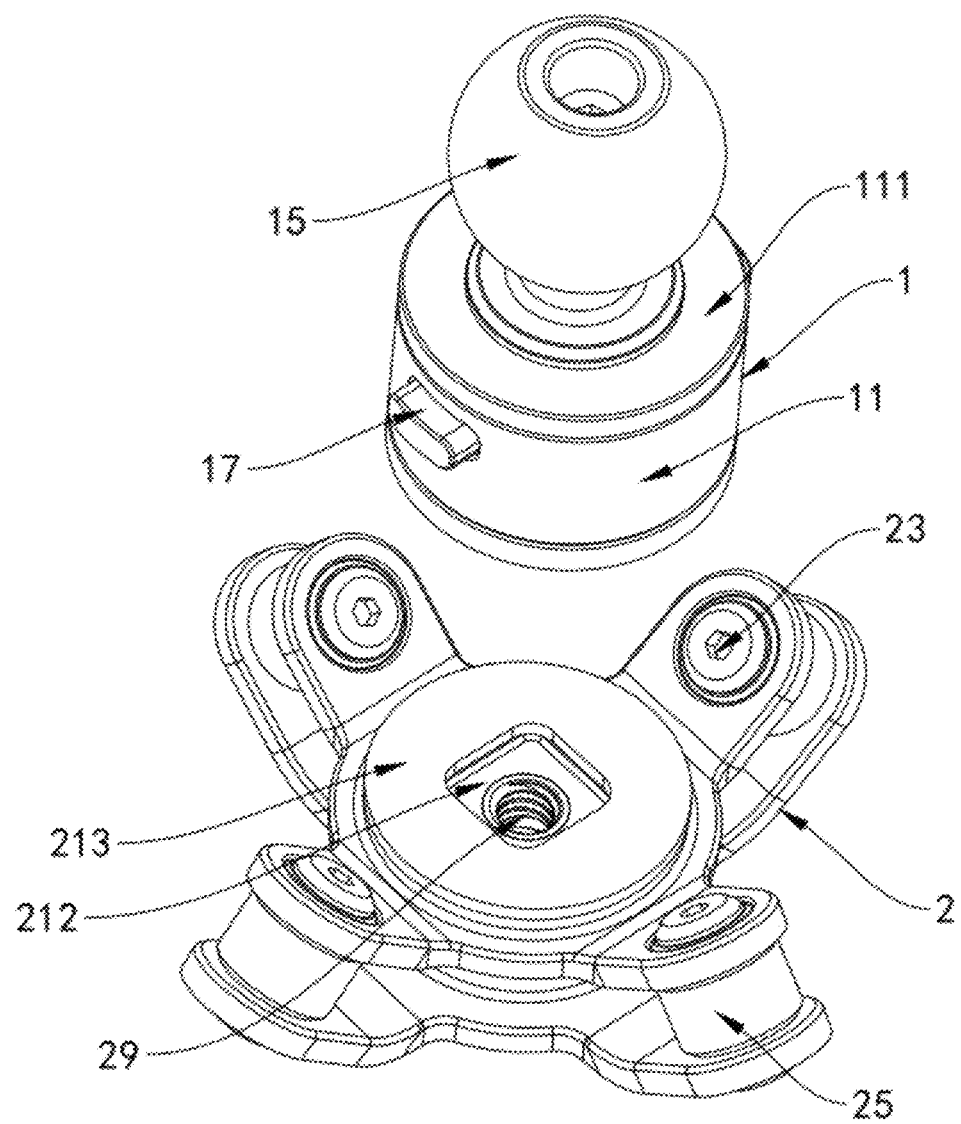
FIG. 4 shows a schematic diagram of a separation between the shock-absorbing mechanism and magnetic quick release mechanism of a shock-absorbing and magnetic quick release system proposed by the present invention.
Figure 5:
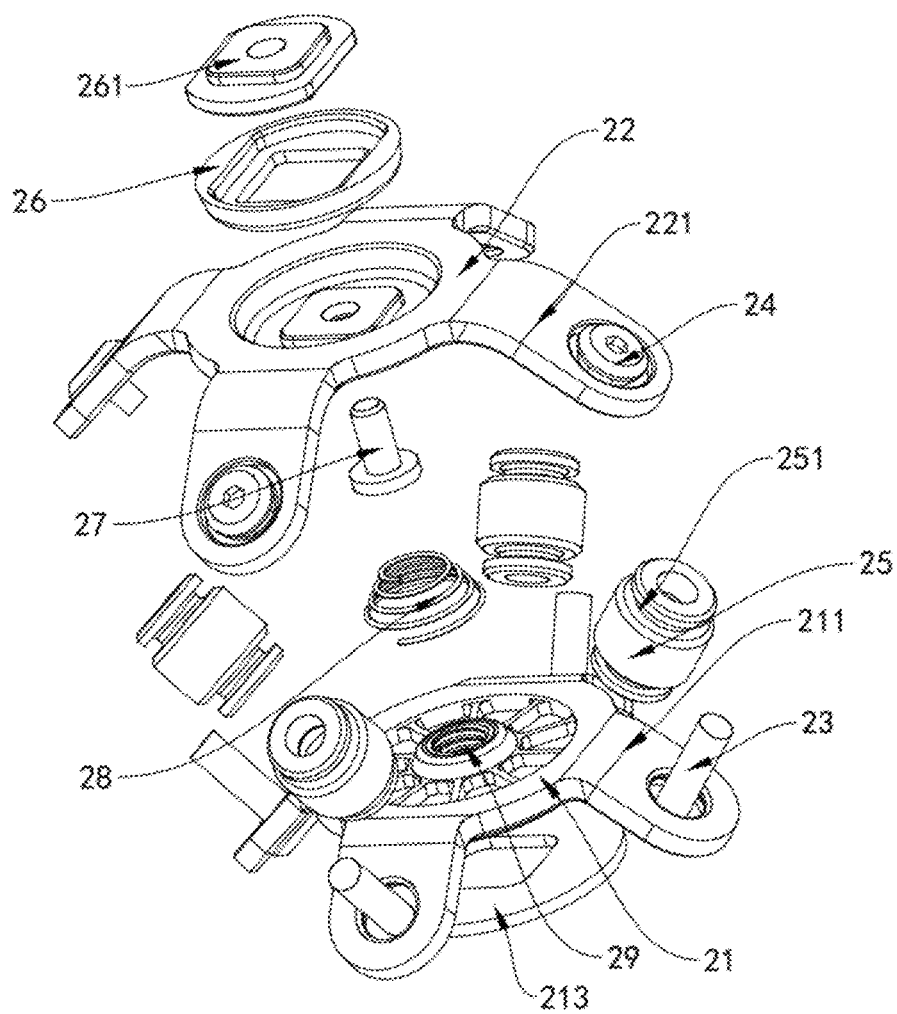
FIG. 5 shows an exploded view of the shock-absorbing mechanism of a shock-absorbing and magnetic quick release system proposed by the present invention.
Figure 6:
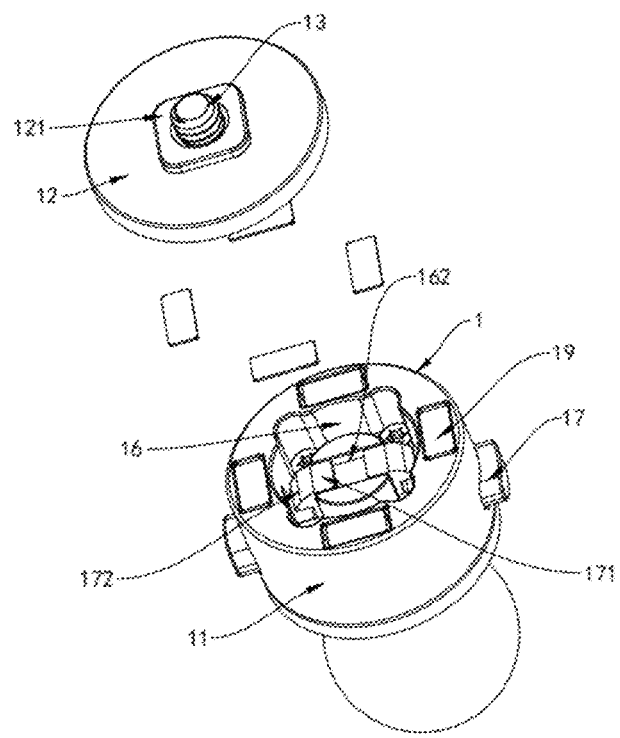
FIG. 6 shows an exploded view of the magnetic quick release mechanism of a shock-absorbing and magnetic quick release system proposed by the present invention.
Figure 7:
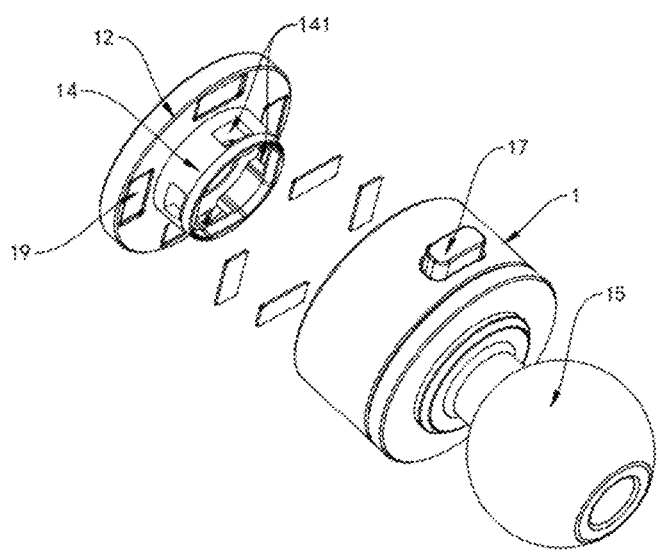
FIG. 7 shows a structure diagram of the magnetic quick release mechanism of a shock-absorbing and magnetic quick release system proposed by the present invention.
Figure 8:
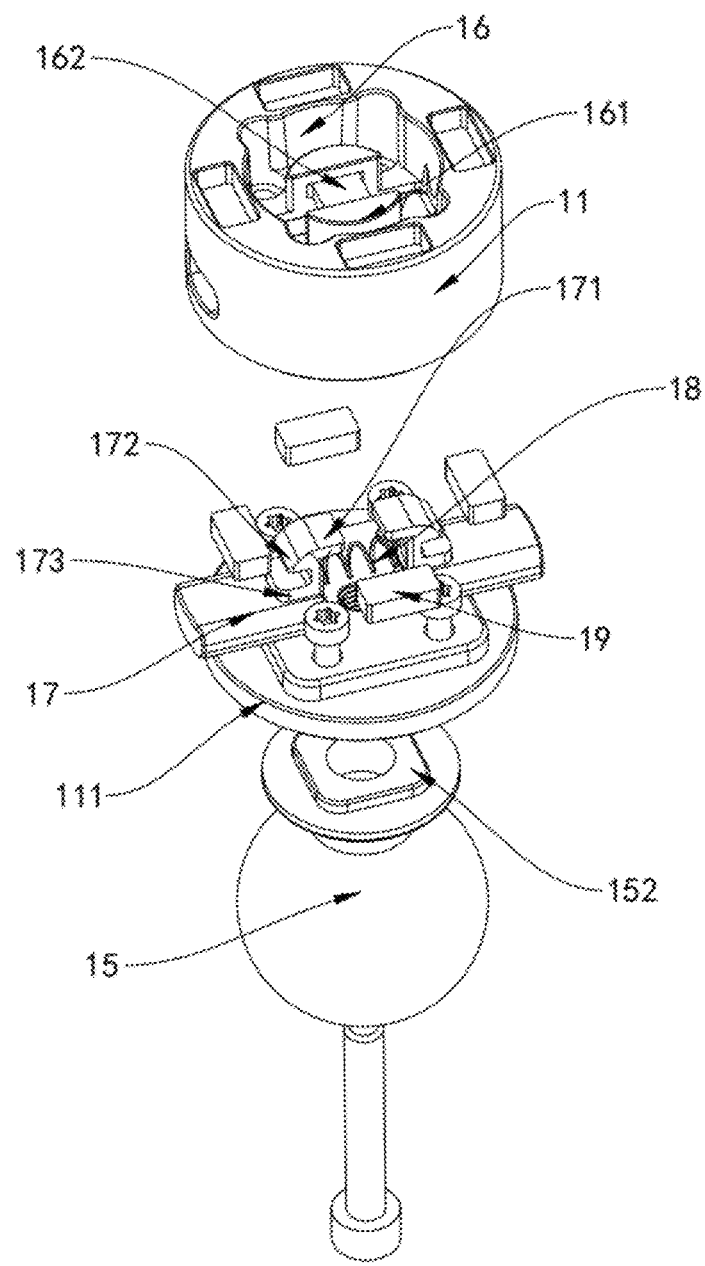
FIG. 8 shows an exploded view of the fixing seat of a shock-absorbing and magnetic quick release system proposed by the present invention.
Figure 9:
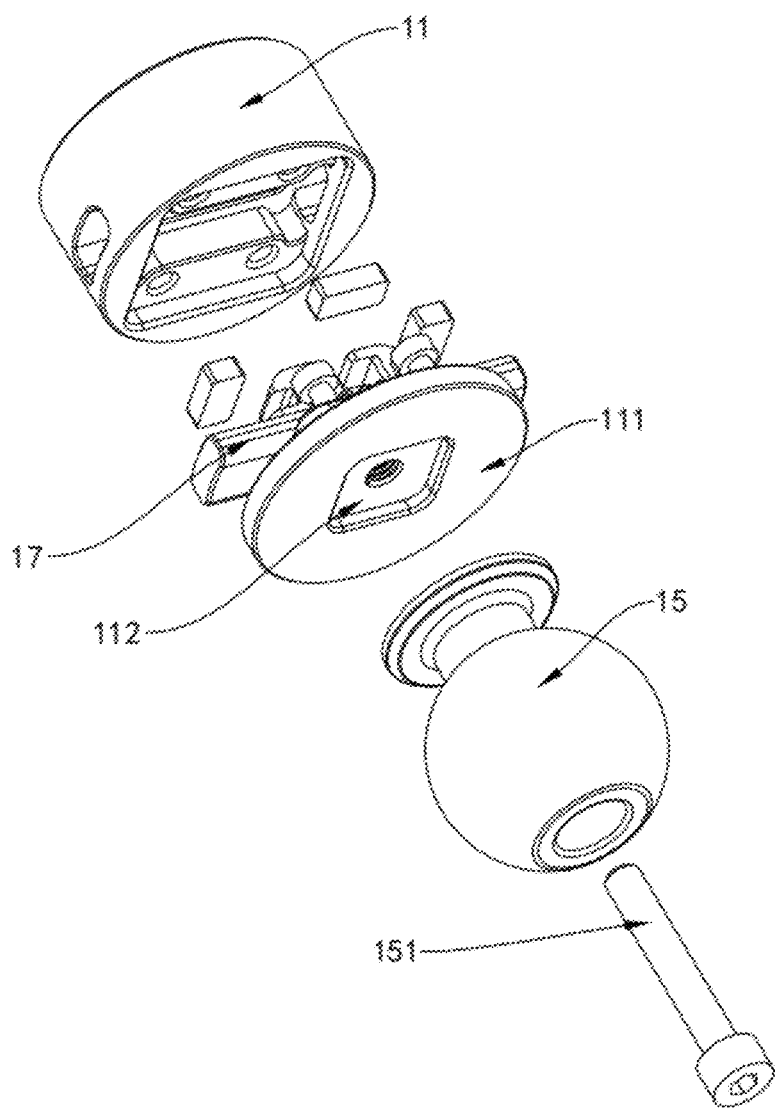
FIG. 9 shows an exploded view of the fixing seat of a shock-absorbing and magnetic quick release system proposed by the present invention.

Embodiment 1, refer to FIGS. 1-9, a shock-absorbing and magnetic quick release system comprising a magnetic quick release mechanism 1 and a shock-absorbing mechanism 2; the magnetic quick release mechanism 1 comprises a fixing seat 11 and a quick release plate 12, and the opposite surfaces of the fixing seat 11 and quick release plate 12 are embedded with magnets 19 for attracting each other.

The fixing seat 11 has a slot 16, and the bottom of the quick release plate 12 has a connecting ring 14 with one end extending to the interior of the slot 16; several locking holes 141 are set around the connecting ring 14.

At least two quick release buttons 17 are symmetrically set in the slot 16; one end of each quick release button 17 extends to the outside of the fixing seat 11, and the top of the other end has a limit plate 171; one end of each limit plate 171 has a buckle 172 for internally locking with one of the locking holes 141; by pressing the quick release buttons 17, the buckles 172 can be driven out of the locking holes 141, thus the quick release plate 12 can be removed;

The shock-absorbing mechanism comprises a shock-absorbing holder I and a shock-absorbing holder II; the shock-absorbing holder I is set at the top of the quick release plate, and a spring and several rubber shock-absorbing sleeves are used between the shock-absorbing holder I and shock-absorbing holder II.

As a specific technical solution of this embodiment, a connecting base 161 is fixedly set at the middle of the slot 16, and a limit slot 162 is set at the top of the connecting base 161; one end of each limit plate 171 away from the buckles 172 extends to the inside of the limit slot 162.

In this embodiment, the set limit slot 162 is intended to provide an auxiliary support for the end of each limit plate 171 away from the buckles 172, ensuring the stability of the overall motion of the quick release buttons 17, limit plates 171 and buckles 172; the whole connecting base 161 is round, and the diameter of which is shorter than that of the connecting ring 14, so it is not in contact with the connecting ring 14, making the insertion of the connecting ring 14 into the slot 16 smoother.

As a specific technical solution of this embodiment, one end of each quick release button 17 has a connecting seat 173, the buckles 172 and limit plates 171 are set at the top of the connecting seats 173 and the end top of each buckle 172 away from the corresponding limit plate 171 is arc-shaped; a compression spring 18 is provided in the connecting base 161, and the two ends of the compression spring 18 are respectively in contact with the corresponding ends of the two quick release buttons 17.

In this embodiment, the connecting seats 173 and quick release buttons 17 are connected by bolts, and the connecting seats 173 are integrally combined with the buckles 172 and limit plates 171; for the set connecting seats 173, when the buckles 172 limit plates 171 are damaged, the connecting seats 173 can be replaced independently, so it is unnecessary to replace the quick release buttons 17, reducing the use-cost; when the user presses both quick release buttons 17 at the same time, the buttons 17 can move relatively to each other and compress the compression spring 18; the quick release buttons 17 can drive the limit plates 171 and buckles 172 on the two connecting seats 173 to move; the limit plates 171 can slide in the limit slot 162 to make the buckles 172 leave the locking holes 141; at this time, the fixing seat 11 can attract the quick release plate 12 through the magnets 19; the user can pull the quick release plate 12 to make its magnets 19 be free from the attraction of the magnets 19 of the fixing seat 11 to remove the quick release plate 12; the removal process is simple, convenient and quick; for the arc-shape design of buckle 172 tops, when the quick release plate 12 is magnetically attracted, the connecting ring 14 can directly contact each arc-shaped part of the buckle 172 tops, so the two buckles 172 can move relatively to each other and compress the compression spring 18; When installing the quick release plate 12, it is unnecessary to press in advance to drive the buckles 172, so the installation is simpler and quicker; the quick release buttons 17 are only used for removing the quick release plate 12.

As a specific technical solution of this embodiment, the quick release plate 12 and fixing seat 11 have a total of eight magnets 19, and the eight magnets 19 are divided into upper and lower groups; each group has four magnets, one group is used as the transmitting end and the other, receiving end.

In this embodiment, four locking holes 141 are provided, and the positions of the four locking holes 141 are corresponding to the four magnets 19 of the quick release plate 12, respectively; such design method ensures that no matter from which angle the quick release plate 12 is jointed with the fixing seat 11, when the four magnets 19 of the quick release plate 12 and the four magnets 19 of the fixing seat 11 are attracted to correct the positions, two of the locking holes 141 can be aligned with the two buckles 172, making the process more convenient and efficient.

As a specific technical solution of this embodiment, a bottom plate 111 is provided in the fixing seat 11, a connecting groove I 112 is set at the bottom of the bottom plate 111, a connecting boss I 121 is set at the top of the quick release plate 12, and a screw I 13 is used in the connecting boss I 121.

In this embodiment, the fixing seat 11 is fixed to the bottom plate 111 by bolts, and the connecting boss I 121 and screw I 13 are used to connect the shock-absorbing mechanism 2; the connecting groove I 112 matches with the connecting boss I 121; other products with a connecting boss I 121 or a connecting groove I 112 can also be connected to the magnetic quick release mechanism 1.

As a specific technical solution of this embodiment, the bottom of the bottom plate 111 is connected to a multi-scenario holder universal ball 15 through a long screw 151, and the top of the multi-scenario holder universal ball 15 has a connecting boss II 152 for fitting with the connecting groove I 112.

In this embodiment, the connecting boss II 152 matches with the connecting groove I 112, and the combination of the connecting boss II 152 and connecting groove I 112 avoids the relative rotation between the multi-scenario holder universal ball 15 and bottom plate 111, making the connection more stable; thanks to the multi-scenario holder universal ball 15, ball fixed holders for different scenarios including car/cycling/yacht applications can be connected and multiple-angle adjustment can be achieved, meeting different requirements of users.

As a specific technical solution of this embodiment, at least four downward bending connecting lugs I 211 are set around the shock-absorbing holder I 21, at least four downward bending connecting lugs II 221 are set around the shock-absorbing holder II 22; four rubber shock-absorbing sleeves 25 are used, both ends of each rubber shock-absorbing sleeve 25 have limit screw locking slots 251, and both ends of each rubber shock-absorbing sleeve 25 are respectively locked in the connecting lugs I 211 and II 221 through the limit screw locking slots 251.

In this embodiment, the set limit screw locking slots 251 ensure the stability of the rubber shock-absorbing sleeves 25 between the connecting lug I 211 and connecting lug II 221; when the magnetic quick release mechanism 1 is subjected to vibration, the vibration passing through the shock-absorbing holder I 21 can be buffered by the spring 28 and rubber sleeves; After passing through the shock-absorbing holder I 21 and being buffered by the spring 28 and rubber sleeves, the vibration transmitted to the shock-absorbing holder II 22 has been reduced greatly; the residual vibration can be transmitted by the shock-absorbing holder II 22 to the smart device fixing mechanism 3 or smart device protection shell; the set shock-absorbing mechanism 2 can help to greatly reduce the damage of vibration to smart devices, ensuring their safer use.

As a specific technical solution of this embodiment, one end of each rubber shock-absorbing sleeve 25 is internally provided with a limit screw I 23, and the other end is internally provided with a limit screw II 24 fitting with the limit screw I 23, and the shock-absorbing holder I 21 is internally provided with a nut I 29 fitting with the screw I 13.

In this embodiment, one end of the limit screw I 23 is screwed into the limit screw II 24, and the nuts of the limit screw I 23 and limit screw II 24 are locked at both ends of each rubber shock-absorbing sleeve 25, ensuring the stability of the limit screw I 23 and limit screw II 24; the combination of the limit screw I 23 and limit screw II 24 is intended to limit the spacing between the shock-absorbing holder I 21 and shock-absorbing holder II 22; The spacing of the four connecting lugs I 211 and four connecting lugs II 221 is constant, so vibration buffering capacity is more balanced, ensuring their stabler use.

As a specific technical solution of this embodiment, the bottom of the shock-absorbing holder I 21 has a connecting groove II 212 fitting with the connecting boss I 121, and the bottom of the shock-absorbing holder I 21 also has a spacer 213.

In this embodiment, the combination of the connecting boss I 121 and connecting groove II 212 avoids the relative rotation between the quick release plate 12 and shock-absorbing holder I. By locking them with the screw I 13, the stability of the connection between the shock-absorbing mechanism 2 and magnetic quick release mechanism 1 can be further ensured; the set spacer 213 is placed between the shock-absorbing holder I 21 and quick release plate 12; the spacer 213 is made of rubber or ductile material, avoiding the quick release plate 12, reducing the vibration, wear and ware area between the quick release plate 12 and shock-absorbing holder I 21, reduces the wear area, and achieving a significant decrease of noise during use.

As a specific technical solution of this embodiment, the top of the shock-absorbing holder II 22 is embedded with a connecting piece 26, and the interior of the connecting piece 26 has a connecting boss III 261; the bottom of the shock-absorbing holder II 22 has a screw II 27 with one end passing through the top of the connecting boss III 261.

In this embodiment, the connecting boss III 261 matches with the connecting groove II 212, and other products with a connecting boss III 261 or a connecting groove II 212 can also be connected to the shock-absorbing mechanism 2, significantly achieving more application scenarios.

Figure 10:
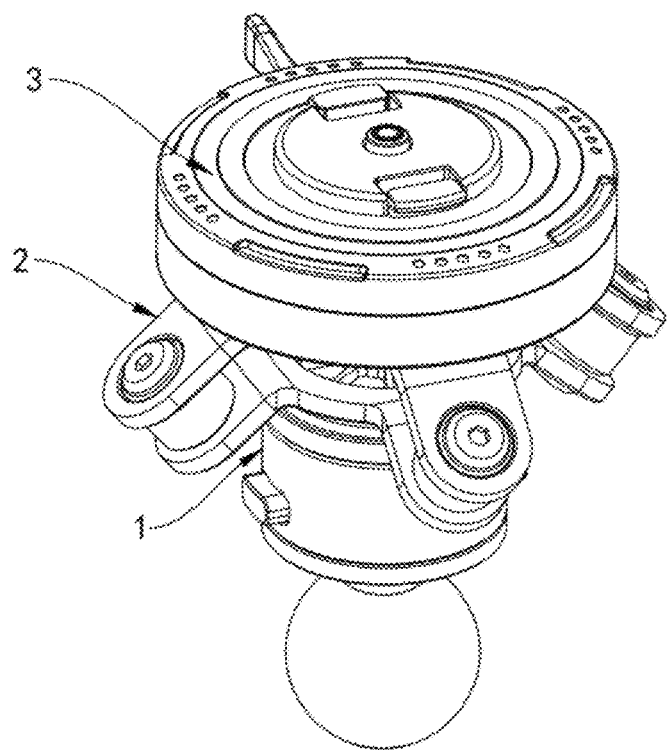
FIG. 10 shows a schematic diagram for the connection between the magnetic quick release mechanism and shock-absorbing mechanism of a shock-absorbing and magnetic quick release system proposed by the present invention and the fixing mechanism of a smart device.
Figure 11:
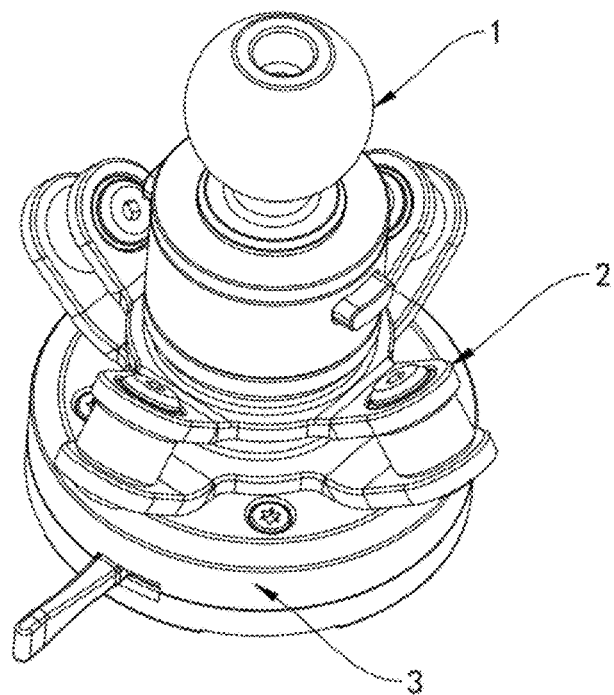
FIG. 11 shows a schematic diagram for the connection between the magnetic quick release mechanism and shock-absorbing mechanism of a shock-absorbing and magnetic quick release system proposed by the present invention and the fixing mechanism of a smart device.
Figure 12:
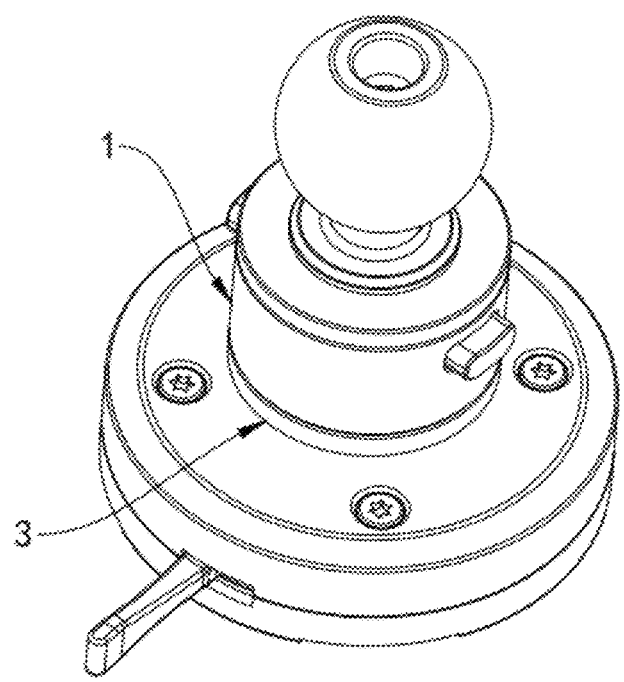
FIG. 12 shows a schematic diagram for the connection between the magnetic quick release mechanism of a shock-absorbing and magnetic quick release system proposed by the present invention and the fixing mechanism of a smart device.
Figure 13:
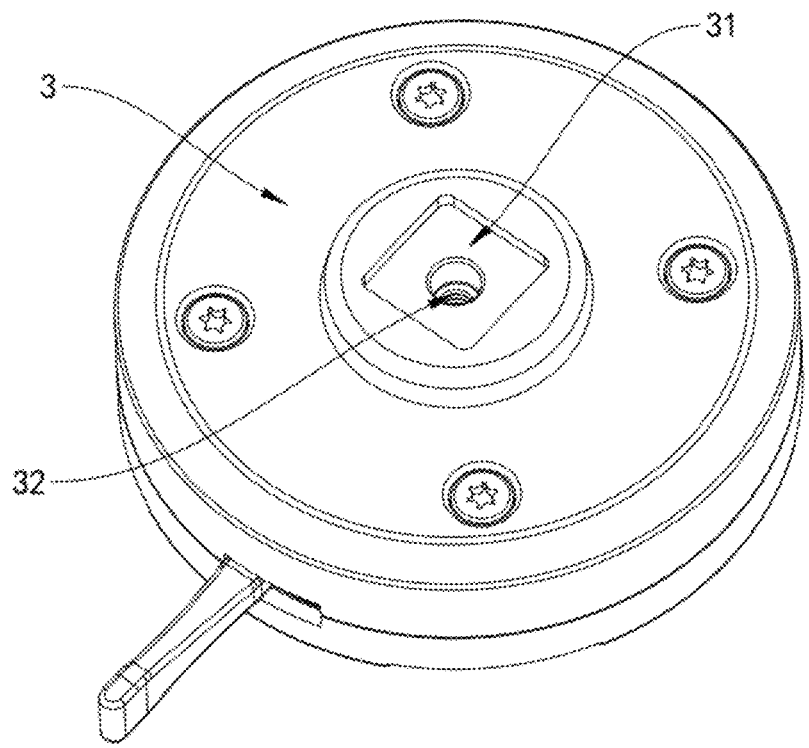
FIG. 13 shows a structure diagram of the smart device fixing mechanism of a shock-absorbing and magnetic quick release system proposed by the present invention.

Embodiment 2, refer to FIGS. 1-13, compared with the above embodiment, this embodiment also includes a smart device fixing mechanism 3; the smart device fixing mechanism is intended to connect a smart device protection shell; before use, a smart device, such as a mobile phone or a tablet PC, should be installed with a protection shell matching with the smart device mechanism, magnetic quick release mechanism 1 and shock-absorbing mechanism 2; the bottom of the smart device fixing mechanism 3 has a connecting groove III 31, and the interior of the connecting groove III 31 has a nut II 32; after combining the shock-absorbing mechanism 2 with the magnetic quick release mechanism 1, the shock-absorbing mechanism 2 can be screwed into the nut II 32 with the screw II 27; the connecting boss III 261 can be fitted into the connecting groove III 31.

The dimensions of the connecting boss I 121, connecting boss II 152 and connecting boss III 261 are the same, and the dimensions of the connecting groove I 112, connecting groove II 212 and connecting groove III 31 are the same; such design can make the magnetic quick release mechanism 1 be directly connected to the smart device fixing mechanism 3 through the screw I 13 and connecting boss I 121 without using the shock-absorbing mechanism 2; the shock-absorbing mechanism 2 can also be directly connected to the smart device fixing mechanism 3; other scenario holders can also be directly connected through the connecting groove II 212 of the shock-absorbing mechanism 2 without using the magnetic quick release mechanism 1; different combinations can be adopted to meet the users' different application requirements in different scenarios thanks to their high versatility, economic benefit conformity and broad application prospects.

In summary, for this shock-absorbing and magnetic quick release system, the quick release plate 12 can be separated from the fixing seat 11 by gripping the quick release buttons 17 to drive the buckles 172 out of the locking holes 141 to achieve a quick release; when installing the quick release plate 12, the magnetic function can directly drive the locking holes 141 to lock the buckles 172, so the installation is quicker; the shock-absorbing mechanism 2 can help to buffer the vibration transmitted by the magnetic quick release mechanism 1, reducing potential damages to smart devices; the shock-absorbing mechanism 2 and magnetic quick release mechanism 1 can be used together or separately or respectively in conjunction with a smart device fixing mechanism 3; with a multi-scenario holder universal ball 15, they can be connected to supporting holders for use in different scenarios based on users' requirements.

It should be noted that, in this article, the terms "comprise", "include", or any other variations thereof are intended to cover non-exclusive inclusion, so that a process, method, article, or device that comprises a list of elements does not only include those elements but also includes other elements not expressly listed, or inherent to such a process, method, article, or devices. Without further limitation, an element defined by the statement "comprising a . . . " does not exclude the presence of additional identical elements in the process, method, article, or device that comprises the element.

Although the embodiments of the present invention have been shown and described, it will be understood by those skilled in the art that various changes, modifications, substitutions and variations can be made to these embodiments within the principles and spirit of the present invention. The scope of the present invention is limited by the appended claims and their equivalents.

The invention claimed is:

1. A shock-absorbing and magnetic quick release system comprising a magnetic quick release mechanism (1) and a shock-absorbing mechanism (2), which is characterized in that:
   the magnetic quick release mechanism (1) comprises a fixing seat (11) and a quick release plate (12), and opposing surfaces of the fixing seat (11) and quick release plate (12) are embedded with magnets (19) for attracting each other;
   the fixing seat (11) has a slot (16), and the bottom of the quick release plate (12) has a connecting ring (14) with one end extending to the interior of the slot (16); several locking holes (141) are set around the connecting ring (14);
   at least two quick release buttons (17) are symmetrically set in the slot (16);
   one end of each quick release button (17) extends to the outside of the fixing seat (11), and the top of the other end has a limit plate (171); one end of each limit plate (171) has a buckle (172) for internally locking with one of the locking holes (141); by pressing the quick release buttons (17), the buckles (172) can be driven out of the locking holes (141), thus the quick release plate (12) can be removed; and
   the shock-absorbing mechanism (2) comprises a shock-absorbing holder I (21) and a shock-absorbing holder II (22); the shock-absorbing holder I (21) is set at the top of the quick release plate (12), and a spring (28) and several rubber shock-absorbing sleeves (25) are used between the shock-absorbing holder I (21) and shock-absorbing holder II (22).

2. The shock-absorbing and magnetic quick release system according to claim 1, which is characterized in that a connecting base is fixedly set at the middle of the slot (16), and a limit slot (162) is set at the top of the connecting base (161); one end of each limit plate (171) away from the buckles (172) extends to the inside of the limit slot (162).

3. The shock-absorbing and magnetic quick release system according to claim 2, which is characterized in that one end of each quick release button (17) has a connecting seat (173), the buckles (172) and limit plates (171) are set at the top of the connecting seats (173) and the end top of each buckle (172) away from the corresponding limit plate (171) is arc-shaped; a compression spring (18) is provided in the connecting base (161), and the two ends of the compression spring (18) are respectively in contact with the corresponding ends of the two quick release buttons (17).

4. The shock-absorbing and magnetic quick release system according to claim 1, which is characterized in that the quick release plate (12) and fixing seat (11) have a total of eight magnets (19), and the eight magnets (19) are divided into upper and lower groups; each group has four magnets.

5. The shock-absorbing and magnetic quick release system according to claim 1, which is characterized in that a bottom plate (111) is provided in the fixing seat (11), a connecting groove I (112) is set at the bottom of the bottom plate (111), a connecting boss I (121) is set at the top of the quick release plate (12), and a screw I (13) is used in the connecting boss I (121).

6. The shock-absorbing and magnetic quick release system according to claim 5, which is characterized in that the bottom of the bottom plate (111) is connected to a multi-scenario holder universal ball (15) through a long screw (151), and the top of the multi-scenario holder universal ball (15) has a connecting boss II (152) for fitting with the connecting groove I (112).

7. The shock-absorbing and magnetic quick release system according to claim 5, which is characterized in that one end of each rubber shock-absorbing sleeve (25) is internally provided with a limit screw I (23), and the other end is internally provided with a limit screw II (24) fitting with the limit screw I (23), and the shock-absorbing holder I (21) is internally provided with a nut I (29) fitting with the screw I (13).

8. The Shock-absorbing and magnetic quick release system according to claim 5, which is characterized in that the bottom of the shock-absorbing holder I (21) has a connecting groove II (212) fitting with the connecting boss I (121), and the bottom of the shock-absorbing holder I (21) also has a spacer (213).

9. The shock-absorbing and magnetic quick release system according to claim 1, which is characterized in that at least four downward bending connecting lugs I (211) are set around the shock-absorbing holder I (21), at least four downward bending connecting lugs II (221) are set around the shock-absorbing holder II (22); four rubber shock-absorbing sleeves (25) are used, both ends of each rubber shock-absorbing sleeve (25) have limit screw locking slots (251), and both ends of each rubber shock-absorbing sleeve (25) are respectively locked in the connecting lugs I (211) and II (221) through the limit screw locking slots (251).

10. The shock-absorbing and magnetic quick release system according to claim 1, which is characterized in that the top of the shock-absorbing holder II (22) is embedded with a connecting piece (26), and the interior of the connecting piece (26) has a connecting boss III (261); the bottom of the shock-absorbing holder II (22) has a screw II (27) with one end passing through the top of the connecting boss III (261).

\* \* \* \* \*